US012780095B2

(12) United States Patent
LaCross

(10) Patent No.: US 12,780,095 B2
(45) **Date of Patent: *Nov. 3, 2026**

(54) VEHICULAR DRIVER MONITORING SYSTEM WITH DRIVER MONITORING CAMERA AND NEAR IR LIGHT EMITTER AT INTERIOR REARVIEW MIRROR ASSEMBLY

(71) Applicant: Magna Mirrors of America, Inc., Holland, MI (US)

(72) Inventor: Anthony J. LaCross, Hastings, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/211,389

(22) Filed: May 19, 2025

(65) Prior Publication Data

US 2025/0276639 A1 Sep. 4, 2025

Related U.S. Application Data

(63) Continuation of application No. 18/390,166, filed on Dec. 20, 2023, now Pat. No. 12,304,391.

(60) Provisional application No. 63/477,833, filed on Dec. 30, 2022.

(51) Int. Cl.

| | |
|---|---|
| ***B60R 1/12*** | (2006.01) |
| ***B60R 1/04*** | (2006.01) |
| ***B60R 1/29*** | (2022.01) |
| *B60R 11/00* | (2006.01) |

(52) U.S. Cl.
CPC .................. *B60R 1/12* (2013.01); *B60R 1/04* (2013.01); *B60R 1/29* (2022.01); *B60R 2001/1253* (2013.01); *B60R 2011/0033* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 2008/0292146 | A1* | 11/2008 | Breed | B60N 2/0022 382/118 |
| 2009/0046538 | A1* | 2/2009 | Breed | B60C 11/24 706/20 |
| 2017/0173262 | A1* | 6/2017 | Veltz | G16H 20/17 |
| 2017/0174230 | A1* | 6/2017 | Goldman-Shenhar | B60W 50/10 |

(Continued)

*Primary Examiner* — Nigar Chowdhury
(74) *Attorney, Agent, or Firm* — HONIGMAN LLP

(57) ABSTRACT

A vehicular driver monitoring system includes an interior rearview mirror assembly. A camera, a light emitter and a PCB are accommodated at a mirror head. An electronic component is disposed at the PCB. Image data captured by the camera is processed to monitor a driver present within the interior cabin of the vehicle. A heat sink is thermally coupled with the PCB and includes heat dissipating fins. When the electronic component is electrically operated, (i) cooling airflow is drawn into the mirror head via a lower vent formed through a lower portion of the mirror casing, (ii) the cooling airflow drawn into the mirror head flows across the heat dissipating fins of the heat sink and (iii) the cooling airflow drawn into the mirror head exits the mirror head via an upper vent formed through an upper portion of the mirror casing.

41 Claims, 7 Drawing Sheets

(56) References Cited

U.S. PATENT DOCUMENTS

2018/0050636 A1 * 2/2018 Espig ........................ B60R 1/23

* cited by examiner

VEHICULAR DRIVER MONITORING SYSTEM WITH DRIVER MONITORING CAMERA AND NEAR IR LIGHT EMITTER AT INTERIOR REARVIEW MIRROR ASSEMBLY

CROSS REFERENCE TO RELATED APPLICATIONS

The present application is a continuation of U.S. patent application Ser. No. 18/390,166, filed Dec. 20, 2023, now U.S. Pat. No. 12,304,391, which claims the filing benefits of U.S. provisional application Ser. No. 63/477,833, filed Dec. 30, 2022, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a single or double ball pivot or joint mounting configuration where the mirror casing and reflective element are adjusted relative to the interior portion of a vehicle by pivotal movement about the single or double ball pivot configuration. The mirror casing and reflective element are pivotable about one or two ball pivot joints by a user that is adjusting a rearward field of view of the reflective element.

SUMMARY OF THE INVENTION

The present invention provides an interior rearview mirror assembly that accommodates a camera and an infrared (IR) or near infrared (near IR) light emitter of a driver monitoring system (DMS) or occupant monitoring system (OMS). Optionally, the mirror head accommodates processing circuitry for the DMS/OMS, and/or a video display screen for displaying video images generated by a camera monitoring system (CMS) of the vehicle to a driver of the vehicle. The electronic components disposed within the mirror head of the mirror assembly generate heat when electrically operated. Thus, the mirror head comprises a plurality of vents and a heat sink configured to draw heat away from the heat generating electronic components and out of the mirror head.

For example, a vehicular driver monitoring system includes a vehicular interior rearview mirror assembly that includes a mirror head adjustably disposed at a mounting base. The mounting base is configured to attach at an interior portion of a vehicle equipped with the vehicular driver monitoring system. The mirror head includes a mirror casing and a variable reflectance mirror reflective element. Reflectance of the variable reflectance mirror reflective element is adjusted responsive to an electrical current applied to the variable reflectance mirror reflective element. A camera is accommodated by the mirror head and operable to capture image data. The camera views through the variable reflectance mirror reflective element. A light emitter is accommodated by the mirror head and operable to emit near infrared (NIR) light. The light emitter, when electrically powered to emit light, emits NIR light that passes through the mirror reflective element. A printed circuit board (PCB) is accommodated by the mirror head and includes (i) a first side that faces the mirror reflective element, and (ii) a second side opposite the first side and separated from the first side by a thickness of the PCB. A heat generating electronic component is disposed at the first side of the PCB, and the heat generating electronic component, when electrically operated, generates heat within the mirror head. With the mounting base attached at the interior portion of the vehicle and when the light emitter is electrically powered to emit light, the camera captures image data representative of emitted NIR light reflected from objects within the interior cabin of the vehicle. An electronic control unit (ECU) includes electronic circuitry and associated software, and the electronic circuitry includes a processor configured to process image data captured by the camera to monitor a driver present in an interior cabin of the vehicle. A heat sink is thermally coupled to the second side of the PCB, and the heat sink, when the heat generating electronic component generates heat within the mirror head, draws heat away from the PCB. A plurality of vents are formed through the mirror casing so that, when the heat generating electronic component generates heat within the mirror head, cooling airflow passes through the plurality of vents and along the heat sink to draw heat away from the PCB and out of the mirror head.

These and other objects, advantages, purposes and features of the present invention will become apparent upon review of the following specification in conjunction with the drawings.

DESCRIPTION OF THE PREFERRED EMBODIMENTS

Figure 1:
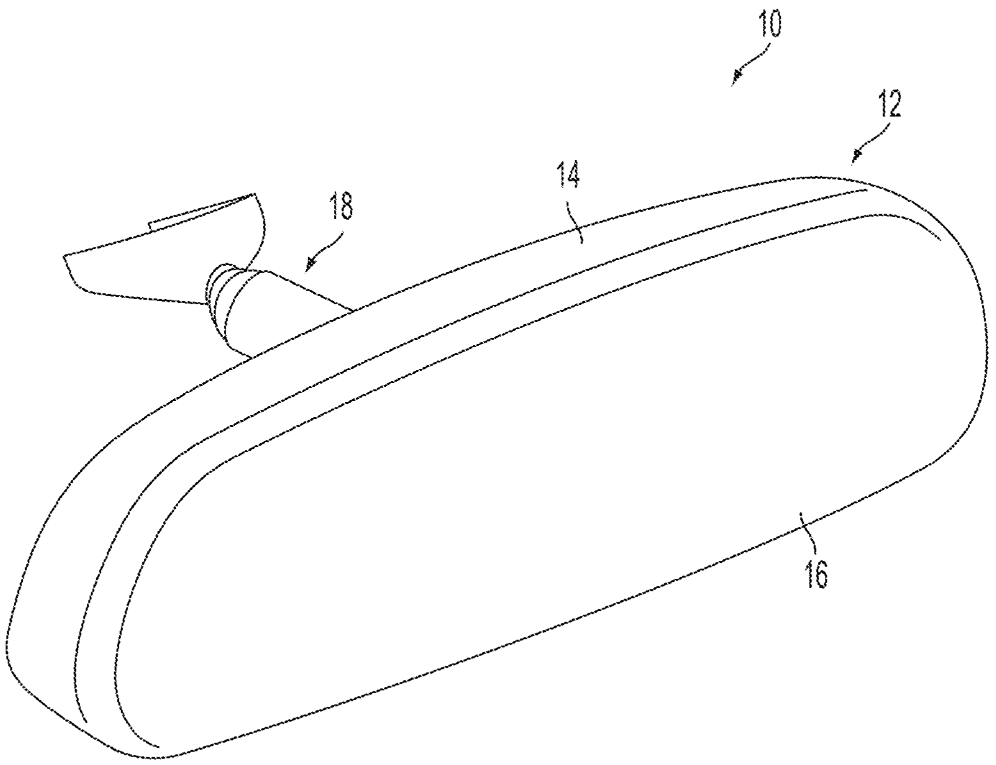
FIG. 1 is a perspective view of an interior rearview mirror assembly.

Referring now to the drawings and the illustrative embodiments depicted therein, an interior rearview mirror assembly 10 for a vehicle includes a mirror head 12 having a casing 14 and a reflective element 16 positioned at a front portion of the casing 14 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The mirror reflective element 16 may comprise a variable reflectance mirror reflective element that varies its reflectance responsive to electrical current applied to conductive coatings or layers of the reflective element.

As discussed further below, the mirror assembly 10 houses or accommodates one or more heat generating electronic components within the mirror head 12. For example, a printed circuit board (PCB) having one or more heat generating electronic components (e.g., one or more processors, sensors, light emitters, and the like) and/or a video display screen may be accommodated by the mirror head 12 behind the mirror reflective element 16. When the electronic components (including the display screen) are electrically operated, they generate heat at the interior of the mirror head 12 and can, if operated without cooling, exceed the functional thermal load of the components. Thus, the mirror head 12 is configured to provide passive cooling for the heat generating electronic components. For example, one or more heat sinks may be thermally coupled to the heat generating electronic components to draw heat away from the components and one or more vents or slots may be formed through the mirror casing to allow for cooling airflow to draw heat away from the heat sink. Optionally, one or more fans may be disposed within the mirror head 12 to promote airflow and provide active cooling of the interior of the mirror head 12.

Figure 2:
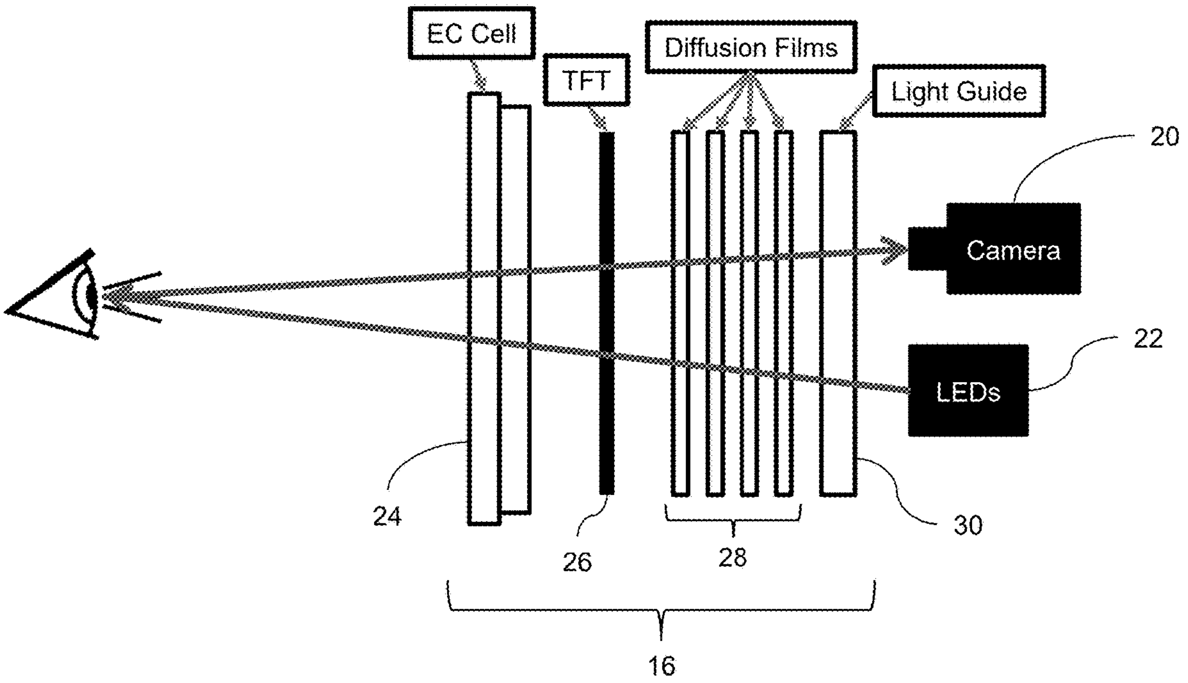
FIG. 2 is a schematic view of a driver monitoring camera, light emitter, mirror reflective element, and video display screen accommodated by the mirror head of the interior rearview mirror assembly.

The mirror assembly 10 includes or is associated with a driver monitoring system (DMS) and/or an occupant monitoring system (OMS), with the mirror assembly comprising a driver/occupant monitoring camera 20 disposed at a back plate (and viewing through an aperture of the back plate) behind the reflective element 16 and viewing through the reflective element 16 toward at least a head region of the driver of the vehicle (FIG. 2). The DMS includes an infrared light (IR light) or near infrared light (near IR light) emitter 22 disposed at the back plate and emitting IR light or near IR light that passes through another aperture of the back plate and through the reflective element 16. The monitoring system may utilize aspects of driver monitoring systems or occupant monitoring systems described in U.S. Publication Nos. US-2022-0377219; US-2022-0254132; US-2022-0242438; US-2021-0323473 and/or US-2021-0291739, and/or U.S. patent application Ser. No. 18/508,351, filed Nov. 14, 2023 and published May 23, 2024 as U.S. Publication No. US-2024-0168355, and/or Ser. No. 18/535,183, filed Dec. 11, 2023 and published Jun. 13, 2024 as U.S. Publication No. US-2024-0190456, and/or International Publication Nos. WO 2023/220222; WO 2023/034956; WO 2022/241423 and/or WO 2022/187805, which are all hereby incorporated herein by reference in their entireties.

With the DMS camera 20 disposed in the mirror head 12, the camera 20 moves together and in tandem with the mirror head 12 (including the mirror casing 14 and mirror reflective element 16 that pivot at a pivot joint that pivotally connects the mirror head to the mounting structure 18 of the interior rearview mirror assembly that in turn mounts at a windshield or at a headliner of the equipped vehicle), such that, when the driver adjusts the mirror head 12 to view rearward via reflections at the mirror reflective element 16, the camera 20 is positioned so as to view at least the driver of the vehicle, such as at least a head region of the driver. The location of the DMS camera 20 and IR LED(s) 22 at the mirror head 12 provide an unobstructed view to the driver. The driver monitoring camera 20 may also provide captured image data for an occupancy monitoring system (OMS) or another separate OMS camera may be disposed at the mirror assembly for the OMS function.

Optionally, the driver monitoring system may be integrated with a camera monitoring system (CMS) of the vehicle. The integrated vehicle system incorporates multiple inputs, such as from the inward viewing or driver monitoring camera and from a forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International Publication No. WO 2022/150826, which are all hereby incorporated herein by reference in their entireties.

Electronic components associated with the DMS and/or the CMS generate heat at the interior of the mirror head 12. For example, the near IR light emitter 22, when electrically operated to emit light through the mirror reflective element 16, generates heat. Further, an electronic control unit (ECU) may be disposed within the mirror head and include one or more data processors or image processors for processing image data and/or sensor data for the DMS, OMS, and/or CMS functions. When the one or more processors are operated to process captured sensor data, heat is generated within the mirror head 12.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or International Publication No. WO 2022/150826, which are all hereby incorporated herein by reference in their entireties.

The mirror assembly may comprise an auto-dimming mirror reflective element (e.g., an electrochromic mirror reflective element) or a prismatic mirror reflective element. For a prismatic mirror, when the head or housing is set to a particular orientation by the driver, a toggle operable by the driver moves the housing and reflective element relative to the mounting structure to flip upward/downward, such as by about four degrees or five degrees, to switch between a daytime or non-glare reducing position (where the driver views reflections at the mirror reflector of the mirror reflective element) and a nighttime or glare reducing position (where the driver views reflections at the surface of the glass substrate of the mirror reflective element). With the auto-dimming mirror, there is typically no movement once the mirror head is set for the particular driver.

Both types of mirrors may be provided with a video display screen that is disposed behind and is viewable through the mirror reflective element. Such video mirrors include a backlit LCD display screen, and a particular form of video mirror is a full display mirror (such a ClearView™ Interior Rearview Mirror Assembly available from *Magna* Mirrors of America, Inc. of Holland, MI USA, or an FDM™ Interior Rearview Mirror Assembly available from Gentex Corporation of Zeeland, MI USA), where the video display screen fills the reflective region, such as by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2019-0258131; US-2019-0146297; US-2019-0118717 and/or US-2017-0355312, which are all hereby incorporated herein by reference in their entireties. In that type of a dual-mode interior rearview mirror, the EC mirror head moves when switching from a traditional reflection mode or mirror mode to a live-video display mode. When electrically operated to display images through the mirror reflective element 16, the video display screen generates heat within the mirror head 12.

As shown in FIG. 2, the mirror reflective element 16 includes (i) an electrochromic (EC) cell 24 (including front and rear glass substrates with an electrochromic medium sandwiched therebetween and bounded by a perimeter seal) for varying reflectance of the mirror reflective element 16, (ii) a thin-film-transistor (TFT) liquid crystal display (LCD) 26 for providing the video display screen, (iii) one or more diffusion films 28, and (iv) a light guide film or layer 30. The DMS camera 20 and the infrared (IR) or near infrared (near IR) light emitter 22 are disposed behind the mirror reflective element 16. The light emitter 22 emits IR or near IR light through the mirror reflective element 16 and the DMS camera 20 captures image data representative of the IR or near IR light reflected off of surfaces and objects within the vehicle and that passes back through the mirror reflective element 16. Optionally, the DMS camera 20 captures image data representative of visible light that passes through the mirror reflective element 16.

The mirror reflective element 16 provides a degree of light transmissivity (e.g., visible light transmissivity and/or near IR light transmissivity) to allow light emitted by the near IR light emitter 22 to pass through the mirror reflective element 16 and for light reflected off of surfaces within the vehicle cabin to pass through the mirror reflective element 16 to be sensed by the camera 20. The mirror reflective element 16 may provide a higher degree of near IR light transmissivity, such as allowing near IR light incident at the mirror reflective element 16 to pass through at a rate of, for example, 40 percent or more, 50 percent or more, 75 percent or more, 90 percent or more, 95 percent or more, and the like, and a lower degree of visible light transmissivity, such as allowing visible light incident at the mirror reflective element 16 to pass through at a rate of, for example, 40 percent or less, 25 percent or less, 15 percent or less, 10 percent or less, 5 percent or less, and the like. Accordingly, the higher transmissivity of near IR light allows the camera 20 to capture image data representative of near IR light passing through the mirror reflective element and the lower transmissivity of visible light at least partially hides or renders covert the camera 20 and the near IR light emitters 22.

Thus, the camera 20 may be placed behind the video display to create a seamless mirror image. In other words, because the camera 20 views through the video display, there is no need for an aperture or gap in the video display (that would interrupt or separate portions of the display screen) to accommodate the camera 20. Optionally, the resolution of the display screen may be adjusted at a position corresponding to the camera 20 and/or light emitter 22 to improve light throughput (i.e., to increase light transmissivity) at the position or positions corresponding to the camera and/or light emitter to improve the captured image data quality.

In some examples, the mirror assembly may have a chin region that extends along and below the lower edge of the mirror reflective element to accommodate the camera and/or the light emitters at the lower edge of the mirror reflective element. For example, the mirror reflective element may include the video display screen that extends along the mirror reflective element above the chin region and the camera may be accommodated at the chin region below the video display screen so that the camera views through the mirror reflective element and not through the video display screen. Optionally, a separate light transmitting cover element or portion of the glass substrate (e.g., a portion of a front glass substrate of an electrochromic mirror reflective element) extends over the chin region so that the camera views through the cover element or portion of the glass substrate, whereby the camera does not view through the mirror reflector of the mirror reflective element.

Electronic components related to the DMS, video display screen, and/or other functions associated with the mirror assembly may be disposed at or thermally coupled to a printed circuit board (PCB) 32 (FIG. 6) disposed within the mirror head 12. For example, the PCB 32 may include circuitry for controlling dimming of the mirror reflective element, generating video images for display at the display screen of the mirror reflective element, and/or processing image data captured by the camera 20 for monitoring the driver and determining, for example, driver attentiveness and/or driver drowsiness. Operation of the DMS camera 20, light emitter 22, display screen, the processor at the PCB 32, and other electronic components disposed within the mirror head 12 generates heat within the mirror head, which must be dissipated from the mirror head 12 to avoid overheating and maintain operational temperatures of the electronic components.

Figure 3:
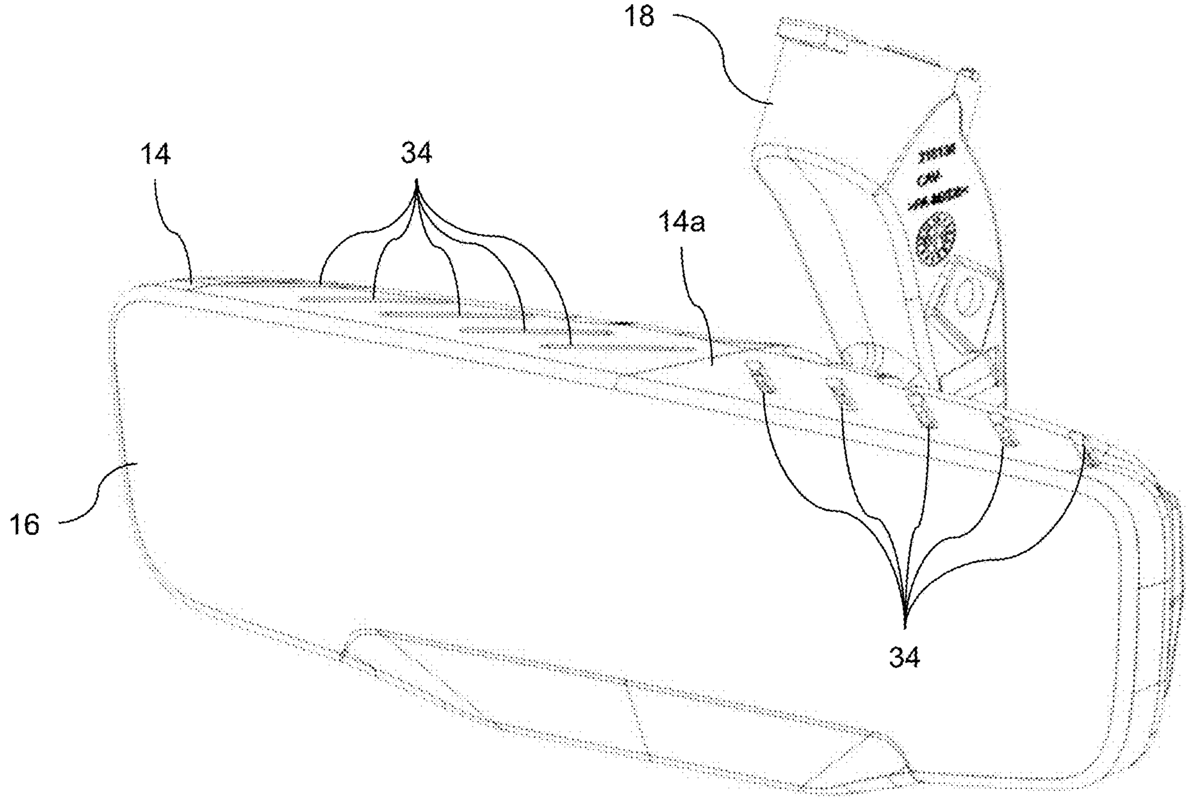
FIGS. 3-5 are perspective views of the interior rearview mirror assembly.
Figure 4:
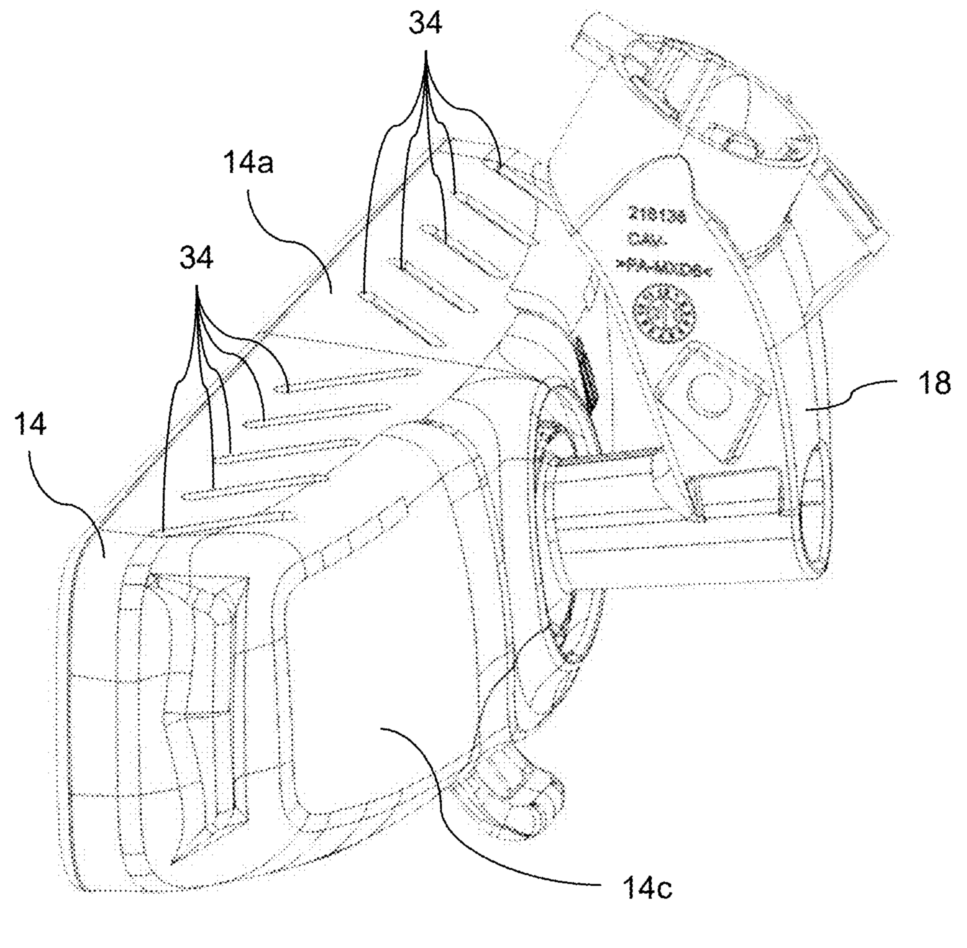
Figure 5:
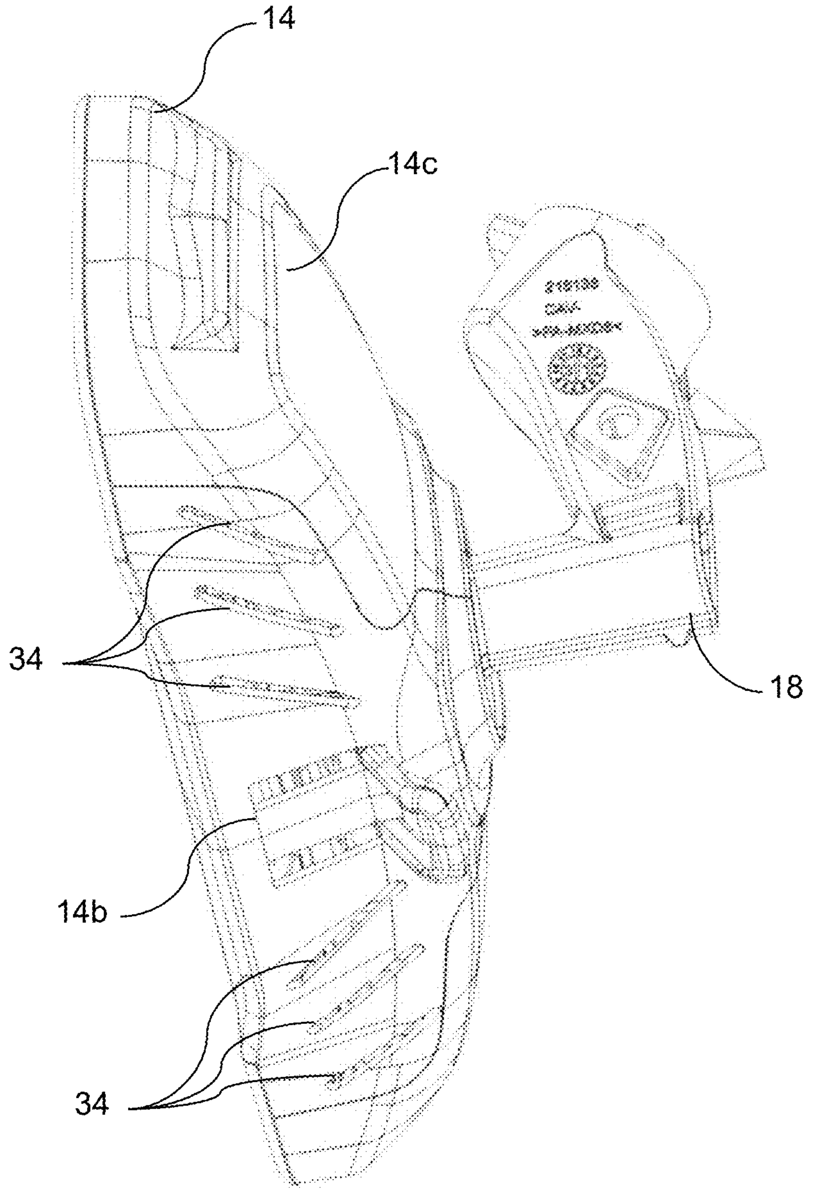

Referring to FIGS. 3-5, the mirror casing 14 includes a plurality of through holes or slits or vents 34 formed through the mirror casing to allow airflow to circulate from exterior the mirror casing 14, through the mirror casing 14, and outward away from the mirror casing 14 to cool the electronic components disposed within. The vents 34 may be formed through any portion of the mirror casing 14, such as a top or upper portion 14*a* extending from an upper edge region of the mirror reflective element 16, a bottom or lower portion 14*b* extending from a lower edge region of the mirror reflective element 16, respective side portions extending from respective side regions of the mirror reflective element 16, and/or a rear portion 14*c* extending between the top portion 14*a*, the bottom portion 14*b*, and the respective side portions and substantially along the mirror reflective element 16.

As shown, the vents 34 include a series of linear gaps formed through the mirror casing 14 and uniformly distributed across the top portion 14*a* and the bottom portion 14*b* of the mirror casing 14. That is, each respective vent 34 extends along the top portion 14*a* or the bottom portion 14*b* between the mirror reflective element 16 and the rear portion 14*c* of the mirror casing 14. As shown, respective vents 34 along a first side of the mirror head 12 extend at a first oblique angle relative to the upper edge of the mirror reflective element and parallel to one another and vents 34 along a second side of the mirror head 12 extend at a different second oblique angle relative to the upper edge of the mirror reflective element and parallel to one another.

Optionally, one or more vents 34 may be formed through the mirror casing 14 at a position corresponding to one or more heat generating components positioned within the mirror casing 14, such as the display screen or DMS camera or light emitter or data processor. Thus, the vents 34 provide passive convective cooling to the electronic components disposed within the mirror head 12, such as by allowing the pressure differential to pull cool air into the vents 34 at the bottom of the mirror casing 14 as the hot air is pushed out of the vents at the top of the mirror casing 14.

A screen or filter or mesh material may be disposed at the mirror casing 14 and over the vents 34 (such as at an interior surface or an exterior surface of the mirror casing 14 and over the vents, or such as within the vents 34 and attached at respective sides of the vents) to prevent contaminants such as dust or bugs from entering the mirror head 12.

Figure 6:
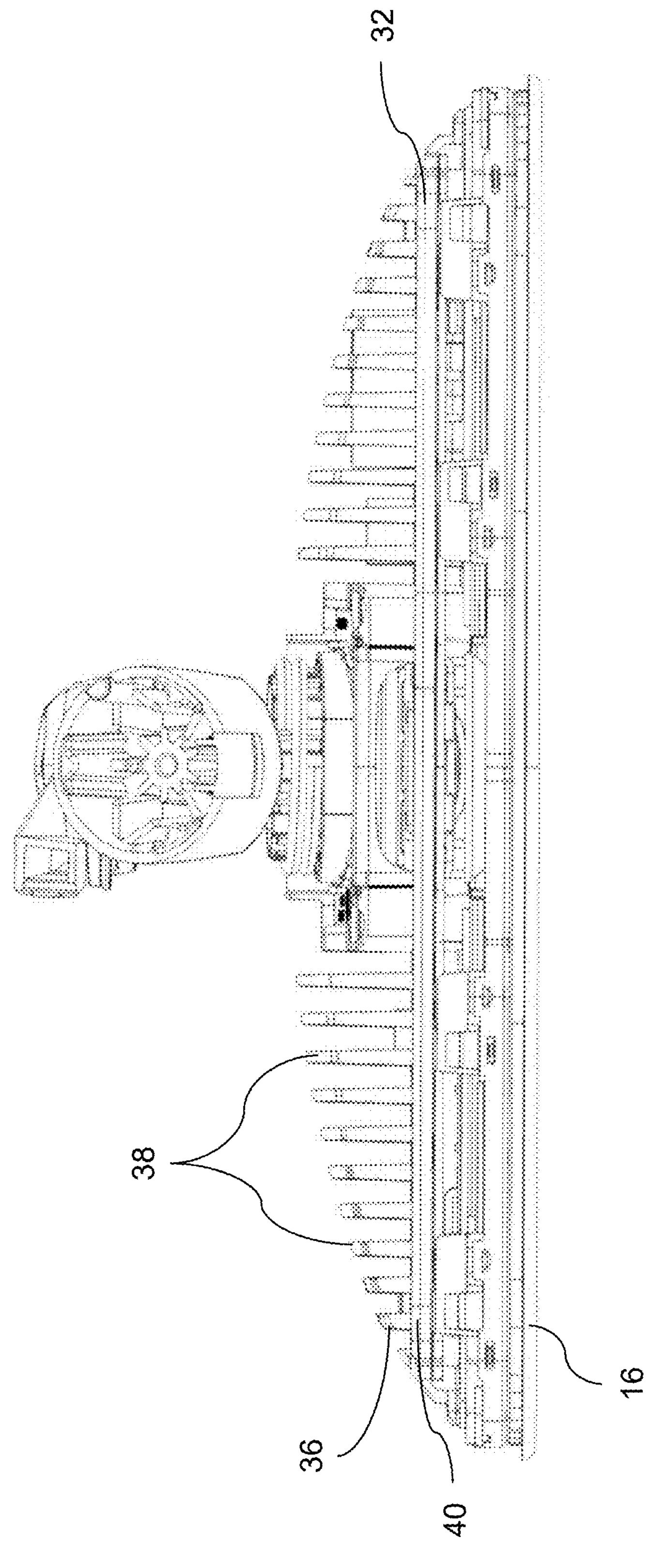
FIGS. 6 and 7 are top and rear views, respectively, of the interior rearview mirror assembly, with the mirror casing removed to show a heat sink disposed within the mirror head.
Figure 7:
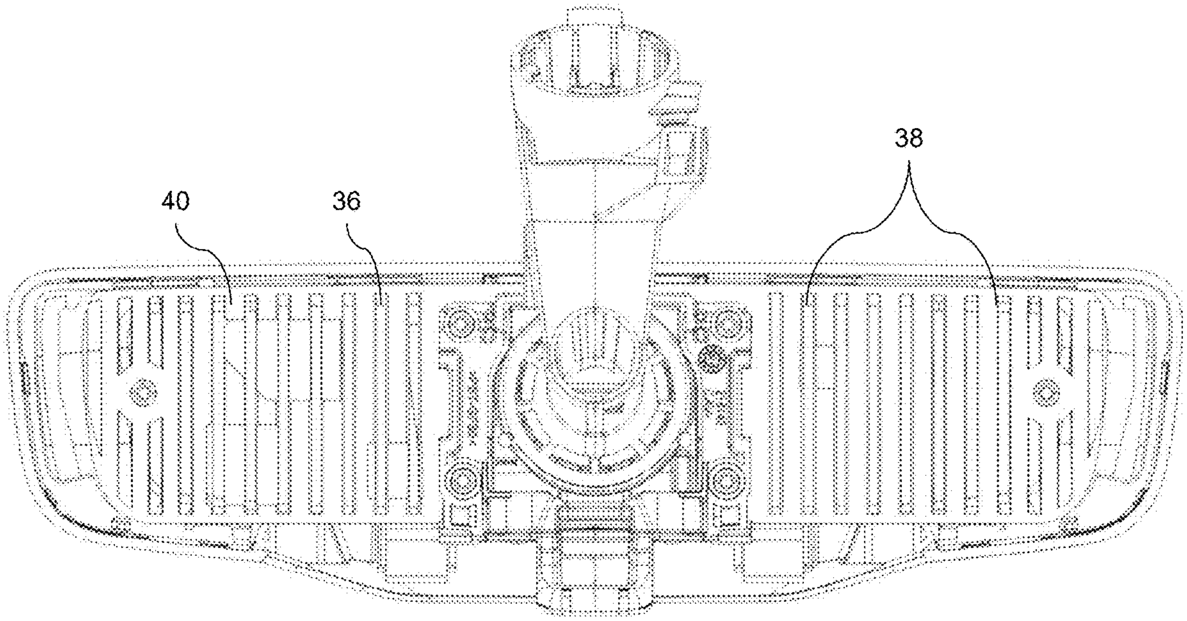

As shown in FIGS. 6 and 7, a heat sink 36 having heat dissipating fins 38 may be disposed within the mirror head and thermally coupled to the PCB 32 (and/or any other heat generating components, such as the DMS camera and light emitter) disposed within the mirror head 12. The PCB 32 includes a first side that faces the mirror reflective element 16 and that attaches to the display screen and/or accommodates the electronic components thereat, and a second side that is opposite the first side. The heat sink 36 includes a plate or attachment surface 40 that is thermally coupled to the second side of the PCB, such as via a thermally conductive adhesive or paste, with the heat dissipating fins 38 protruding from the plate 40 and away from the PCB 32.

In the illustrated example, the heat dissipating fins 38 are uniformly distributed along attachment plate 40 of the heat sink 36, parallel to one another, and substantially perpendicular to a plane of the PCB 32 and the mirror reflective element 16 so that air passing between the vents 34 at the bottom of the mirror casing 14 and the vents 34 at the top of the mirror casing 14 passes between and along the heat dissipating fins 38 to dissipate heat away from the heat sink 36 and away from the mirror head 12. Although shown as being generally vertically oriented, the heat dissipating fins may be generally horizontally oriented (or at any suitable angle relative to the plane of the mirror reflective element). That is, in the illustrated example, the heat dissipating fins 38 extend between a lower edge region of the mirror head and an upper edge region of the mirror head and perpendicular to a longitudinal axis of the PCB 32 and the mirror reflective element 16, but may extend at any suitable angle within the mirror head, such as extending between a left edge region of the mirror head and a right edge region of the mirror head and parallel to the longitudinal axis of the PCB 32 and the mirror reflective element 16. The respective vents 34 may be formed through the mirror casing at positions corresponding to the respective end regions of the heat dissipating fins 38.

The heat dissipating fins 38 are configured to accommodate the shape of the mirror casing 14, such that heat dissipating fins 38 at the periphery or outer edge regions of the mirror head 12 are shorter (or protrude a shorter distance from the attachment plate 40) as compared to heat dissipating fins 38 at a central region of the mirror head 12, to accommodate the curved or rounded shape of the mirror casing 14 (e.g., FIG. 6). Optionally, one or more heat dissipating fins 38 may protrude from the attachment plate 40 at a position corresponding to one or more heat generating components positioned at the PCB 32, such as the display screen or DMS camera or light emitter or at a data processor or image processor that processes image data captured by the camera.

Thus, the heat sink 36 further enables passive cooling of the mirror head 12 as air is directed through the fins on the rear heat sink to remove heat from the components that are thermally connected to the heat sink. Optionally, the assembly includes two or more heat sinks, such as one for the display screen backlight, and one for the circuitry at the PCB (such as the one or more processors for processing DMS image data or controlling the video display screen). The two or more heat sinks are thermally coupled to the respective heat generating components to help dissipate local hotspots. The heat sink substantially spans the width of the mirror head 12 to provide a larger thermal mass to counter thermal spikes. An outermost heat sink may have a more direct path to ambient air and thus has an improved ability to remove heat from the system.

Optionally, one or more fans may be electrically operable to direct airflow between and along the heat dissipating fins 38 of the heat sink 36 to provide active cooling and improve the cooling performance of the mirror assembly. For example, the fan may comprise a blower fan that pulls fresh air through the vents 34 and from behind (or below or to the side of the mirror head) and pushes the airflow across the heat dissipating fins 38 along the length or height of the mirror head and out of the vents at the opposite side of the mirror head. That is, the fan may comprise an axis of rotation that is substantially parallel to a longitudinal axis of the heat dissipating fins to direct or draw the airflow between and along the heat dissipating fins. The one or more fans may be disposed at or near vents along the lower portion **14*b* of the mirror head 12 and direct airflow upward along the heat sink and outward through the vents along the upper portion 14*a* of the mirror head 12, or the one or more fans may be disposed at or near vents along the upper portion 14*a* of the mirror head 12 and direct airflow downward along the heat sink and outward through the vents along the lower portion 14*b* of the mirror head 12**

Optionally, the fan may comprise an axial fan that aids the natural convection of the mirror with vents in the top and the bottom of the mirror head. In other words, the axial fan may comprise an axis of rotation that is substantially perpendicular to the longitudinal axis of the heat dissipating fins so that airflow may be reflected from a central position of the heat sink and redirected along the heat dissipating fins. The axial fan may be disposed at or near vents along the rear portion **14*c* of the mirror head and direct airflow radially from the fan along the heat sink and outward through the vents along the upper portion 14*a* and/or the lower portion 14*b*** of the mirror head.

Furthermore, the fan may comprise a piezo electric fan that aids in the natural convection of the mirror with vents in the top and the bottom of the mirror head. A piezo electric fan provides silent operation and there is no wear surface.

The mirror assembly 10 and the electronic components accommodated by the mirror head 12 may be configured to optimize packaging of the mirror head and decrease thermal load on the system. For example, the mirror assembly may be configured to provide a one box solution and house all associated electronics within the mirror head 12, such as the video display screen, the DMS light emitter, the DMS camera, the EC cell, the processor or ECU for controlling operation of the video display screen (the display ECU), the processor or ECU for providing the DMS and OMS (the DMS/OMS ECU), and a connection to the one or more cameras capturing image data for display at the video display screen (such as a camera monitoring system (CMS) of the vehicle).

Optionally, the mirror assembly may be configured to provide a one and a half box solution with some electronics housed outside of the mirror head to alleviate packaging and improve styling and decrease the thermal load on the system by separating some of the heat generating components. For example, the mirror head may accommodate the video display screen, the DMS light emitter, the DMS camera, the EC cell, the display ECU, and the connection to the one or more cameras capturing image data for display at the video display screen. The DMS/OMS ECU may be disposed exterior the mirror head.

Optionally, the mirror assembly may be configured to provide a two box solution with additional electronics housed outside of the mirror head to further alleviate packaging and improve styling and further decrease the thermal load on the system. For example, the mirror head may accommodate the video display screen, the DMS light emitter, the DMS camera, the EC, and a connector PCB. The connector PCB may electronically couple to the display ECU, the DMS/OMS ECU, and the connection to the CMS, which are all disposed exterior the mirror head.

Optionally, the DMS and/or OMS may be associated with a human machine interface (HMI) for receiving inputs from the driver and/or occupants of the vehicle for controlling the DMS/OMS, and/or one or more other systems of the vehicle, such as a climate control system, a navigation system, a hands free communication system, and the like. For example, the DMS may provide the HMI, such that the driver may perform a gesture (such as movement of the driver's head or eyes) that is viewed by the DMS (i.e., represented in the image data captured and processed by the DMS), and based on the DMS determining that the driver has performed the gesture, the DMS communicates a control signal to a system of the vehicle. Thus, the system may perform gesture recognition for menu control and to provide a HMI for one or more systems of the vehicle.

In some examples, the system may use the DMS as an interface for controlling a menu or adjusting the view provided by the display screen. The system may track the driver's eyes for control of panX/panY, field of view and perspective of the display/camera. The system may track the driver's eyes for power control of display brightness, EC dimming, and the like. For example, the system may perform dynamic power management energy savings by operating the mirror or display in a low power mode or dimmed mode when the driver is determined to be looking away from the display screen and the system may energize or brighten or operate the mirror or display in a standard power mode or brightened mode when the system determines that the driver is looking at the display screen.

The mirror head may include a microphone for HMI hands free operations. Audio inputs captured by the microphone may be processed to determine voice commands provided for the user interface. Optionally, the system may be integrated with a vehicle microphone disposed remote from the mirror head for hands free operations.

Optionally, the HMI may be disposed at the vehicle center console or center stack, such as at an infotainment screen of the vehicle, to provide additional controls and settings, and diagnostics. Optionally, the system may be integrated with a cellphone or mobile device application via the center stack for custom control and diagnostics. The system may provide capacitive touch support, support for onscreen diagnostics, support for hardware buttons, support for BLUETOOTH™ integration with the mobile application.

Moreover, the system may have the ability to integrate with third party application programming interfaces (APIs), such as for insurance companies, risk management, fleet monitoring, or the trucking and shipping industry. The system may provide parental monitoring. The system may have the ability to integrate with infotainment interface systems, such as Apple CarPlay™ and Android Auto, such as for web conferencing or FaceTime™ using the DMS camera so that the driver may participate in video meetings hands free while driving.

The system may provide logging capability for reconstruction of events and actions of the driver prior to and during a collision. The system may be integrated with autonomous vehicle driving systems for determining if the driver is engaging in events/inputs related to distracted driving.

The system may include a self-cleaning or self-defrosting camera lens using high pressure air, or actuator, or heat, or high pressure windshield wiper fluid, or high pressure high temperature windshield wiper fluid, or ultrasonic cleaning methods.

Optionally, the system may include a bootloader via CAN bus, ENET, BLUETOOTH™, center stack, WiFi™, USB, cellular signal, SD card, or OTA.

System architecture may include an isolated vehicle gateway for CAN/LIN/ENET interface with the vehicle. Optionally, there may be isolation between the DMS application and the CMS application. For example, there may be physically separate system on a chip (SoCs) for the DMS and CMS. Optionally, the DMS and CMS may be disposed on the same physical SoC, with separation via a microcontroller unit (MCU) island. Optionally, the DMS and CMS may be disposed on the same physical SoC, with separation via CPU cores. Optionally, the DMS and CMS may be disposed on the same physical SoC, with separation via real-time operating system (RTOS) tasks. Optionally, the DMS and CMS may be separated via remote processing of CMS (multiple PCBs) communication via serialization (similar to a multi-camera CMS solution). The system architecture may include custom protocol to communicate between the CMS and DMS applications, and to communicate between the vehicle gateway MCU and the CMS/DMS applications.

Optionally, Automotive Open System Architecture (AutoSAR) is isolated to the vehicle gateway. Optionally, the system architecture includes complete AutoSAR of CMS and DMS.

Furthermore, the system may receive the video stream from other cameras or sensors disposed at the vehicle. The system may provide a cross traffic monitoring variant for reverse and forward travel of the vehicle. The system may provide cascading capability of image signal processing for multiple DMS camera feeds and multiple CMS camera feeds. The system may perform video stitching. The system may provide picture-in-picture capability. The system may be in communication with GPS for logging location of DMS events and CMS object detection events. The system may be integrated with OSM and CMS. The system may perform remote processing for OSM/ISM, CMS/DMS variant (such as with 3 or more displays and 8 or more cameras). The system may provide OpenGL support, vector graphics support, animation support, manufacturer logo support, splash screen support, support for less than two second boot sequence for video to be displayed on screen, OPEN LDI display support, OLED display support, support to use cameras as ambient light sensors, backlight support, intelligent EC dimming support (OSM and ISM, or ISM only, or OSM only), intelligent backlight dimming support, automatic calibration of cameras, and auto tuning of cameras based on focus and lens binning. The system may perform image stabilization using vehicle information, cameras, accelerometer, gyroscopes, and the like. The system architecture may provide cyber security support and high resolution display support. The system may be self-actuating (with a toggle for five degrees).

The system may provide back seat monitoring as a pop-up or persistent display section (PiP). The system may provide trailer camera and repeater support, camera repeater support, support for hardware floating point ALU, support for software floating point ALU, support for 12 bit ADC, support for input frequency capture, PWM output support, 24 bit RGB and 16 bit YUV color space support, support for alpha blending, support for EC dimming, support for LC dimming.

The system may provide video logging, with a trigger on the bottom of the mirror head, a trigger based on a vehicle signal (such as via the CAN, LIN, ENET or other bus network), or a trigger based on a collision.

The system may include IR filtering light sensors. The system may vary display intensity with ambient lighting. Camera video quality and tuning may be based on light detections.

The CMS may perform object detection. For example, the CMS may provide indicators to the driver of approaching vehicles and objects. The system may include blinking LEDs as indication, audio alerts or beeps as indication. The system may report to the vehicle to indicate to the driver. The system may pulse a display backlight as an indicator. The system may provide object detection and alert of an emergency vehicle in the distance. The system may provide object detection and alert of higher speed vehicles approaching in the distance. The system may perform object detection for cross traffic monitoring in the forward and reverse directions of travel of the vehicle. The system may log events of object detection for crash analysis or other analytics. The system may perform object detection to determine a dirty camera lens.

The system may perform driver monitoring and provide an alert in the event that the driver is engaging in a distracted driving behavior, such as using a mobile device or cellphone. The system may utilize sound, light indicators, seat vibrations, or steering wheel haptic responses, and the like, to alert the driver and/or passengers of distracted driving. The system may perform facial recognition as part of an anti-theft feature. The system may perform facial recognition to determine a profile that matches an identity of the driver, such as for mirror settings, seat position, head unit settings, radio presets, climate control, mood or ambient lighting, cabin lighting, sun roof activation, and/or moon roof activation. The system may perform driver monitoring to detect driver seizures, heart attacks, or other medical emergencies. The system may provide a hands-on-wheel alert. The system may perform driver monitoring to enable/disable autonomous and semi-autonomous driving features, such as self-driving features and cruise control. The system may perform driver monitoring for seat belt detection, and vehicle safety integration.

Thus, the driver monitoring system includes a DMS camera and an IR or near IR light emitter, where the DMS camera is configured to capture image data representative of IR or near IR light reflected from surfaces and objects within the interior cabin of the vehicle. The DMS camera and the light emitter are accommodated by the mirror head of an interior rearview mirror assembly, with the DMS camera viewing through a mirror reflective element of the mirror assembly and the light emitter, when electrically operated to emit light, emitting light through the mirror reflective element. Optionally, the mirror reflective element may include a video display screen, with the DMS camera and light emitter disposed behind the video display screen. The mirror head accommodates a PCB having one or more control modules or processors configured to provide the DMS, OMS, and/or CMS function of the vehicle. Collectively, the DMS camera and light emitter and the processors at the PCB generate heat within the mirror head when electrically operated. Thus, the mirror head includes a mirror casing having a plurality of vents formed therethrough and a heat sink is thermally coupled to the PCB so that cooling airflow may pass through the vents of the mirror casing, through and along heat dissipating vents of the heat sink and heated airflow may exit the mirror head via the vents to draw heat away from the heat generating components and away from the mirror head.

The interior mirror assembly may comprise a dual-mode interior rearview video mirror that can switch from a traditional reflection mode to a live-video display mode, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The video display screen of the video mirror, when the mirror is in the display mode, may display video images derived from video image data captured by a rearward viewing camera, such as a rearward camera disposed at a center high-mounted stop lamp (CHMSL) location, and/or video image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled outermost exposed perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having a curved or beveled outermost exposed perimeter edge, or such as a mirror assembly having a prismatic reflective element that is disposed at an outer perimeter edge of the mirror casing and with the prismatic substrate having a curved or beveled outermost exposed perimeter edge, such as described in U.S. Pat. Nos. 9,827,913; 9,174,578; 8,508,831; 8,730,553; 9,598,016 and/or 9,346,403, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910, 854; 5,142,407 and/or 4,712,879, which are hereby incorporated herein by reference in their entireties.

Although shown as an electrochromic mirror application, it is envisioned that the mirror assembly may comprise a prismatic reflective element. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757, 109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EYEQ™ image processing chip available from Mobileye Vision Technologies Ltd. of Jerusalem, Israel, and such as an image processor of the types described in U.S. Pat. No. 9,126,525, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and publications being commonly assigned and being hereby incorporated herein by reference in their entireties).

Optionally, the mirror assembly may include other electrically operated or powered accessories, such as a compass sensor and compass display. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Such a compass sensor and circuitry for the compass system that detects and displays the vehicle directional heading to a driver of the vehicle may comprise any suitable compass sensor and/or circuitry, such as a compass system and compass circuitry that utilizes aspects of the compass systems described in U.S. Pat. Nos. 7,370,983; 7,329,013; 7,289,037; 7,249,860; 7,004,593; 6,642,851; 4,862,594; 4,937,945; 5,131,154; 5,255,442; 5,576,687; 5,632,092; 5,708,410; 5,802,727; 5,924,212; 6,087,953; 6,222,460 and/or 6,513,252, which are all hereby incorporated herein by reference in their entireties.

The camera or sensor or light of the driver monitoring system may utilize head and face direction and position tracking and/or eye tracking and/or gesture recognition. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/220222; WO 2023/034956; WO 2022/241423 and/or WO 2022/187805, which are hereby incorporated herein by reference in their entireties.

Optionally, the DMS camera may be used to detect ambient light and/or glare light (emanating from headlamps of a trailing vehicle) for use in providing auto-dimming of the EC mirror reflective element. The DMS camera may be disposed in the mirror head and viewing rearward through the mirror reflective element. The processing of image data captured by the DMS camera may be adjusted to accommodate the angle of the mirror head so that the ECU or system, via image processing of image data captured by the DMS camera, determines headlamps of a trailing vehicle (behind the equipped vehicle and traveling in the same direction as the equipped vehicle and traveling in the same traffic lane or in an adjacent traffic lane) to determine glare light at the mirror reflective element. The processing of image data captured by the DMS camera is adjusted to accommodate the degree of dimming of the mirror reflective element. For example, the system knows how much the mirror reflective element is dimmed (responsive to the determined glare light intensity and location) and can accommodate for the mirror dimming level when processing captured image data to determine presence and intensity of light sources/headlamps rearward of the vehicle. The intelligent/automatic mirror dimming functions may utilize aspects of the systems described in U.S. Publication Nos. US-2019-0258131 and/or US-2019-0047475, and/or International Publication No. WO 2022/150826, which are all hereby incorporated herein by reference in their entireties.

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links.

Changes and modifications in the specifically described embodiments may be carried out without departing from the principles of the present invention, which is intended to be limited only by the scope of the appended claims as interpreted according to the principles of patent law.

The invention claimed is:

1. A vehicular driver monitoring system, the vehicular driver monitoring system comprising:

an interior rearview mirror assembly comprising a mirror head adjustable about a mounting structure, wherein the mounting structure is configured to attach at an interior portion of an interior cabin of a vehicle equipped with the vehicular driver monitoring system;

wherein the mirror head comprises a mirror casing, and wherein the mirror head accommodates an electrochromic mirror reflective element;

a camera accommodated at the mirror head;

wherein, with the mounting structure attached at the interior portion of the interior cabin of the vehicle, the camera views a driver-head region within the interior cabin of the vehicle;

a light emitter accommodated at the mirror head;

wherein the light emitter, with the mounting structure attached at the interior portion of the interior cabin of the vehicle, is electrically operable to emit near infrared (NIR) light that illuminates at least the driver-head region within the interior cabin of the vehicle;

wherein a printed circuit board (PCB) is accommodated by the mirror head, and wherein the PCB comprises (i) a first side that faces the electrochromic mirror reflective element, and (ii) a second side opposite the first side and separated from the first side by a thickness of the PCB;

wherein an electronic component is disposed at the PCB;

wherein, with the mounting structure attached at the interior portion of the interior cabin of the vehicle, the camera is operable to capture image data at least when the light emitter operates to emit near infrared (NIR) light that illuminates at least the driver-head region within the interior cabin of the vehicle;

an electronic control unit (ECU);

wherein image data captured by the camera is transferred to the ECU;

wherein the ECU comprises electronic circuitry and associated software, and wherein the electronic circuitry comprises an image processor operable to process image data transferred to the ECU, and wherein, with the mounting structure attached at the interior portion of the interior cabin of the vehicle, the ECU processes image data transferred to the ECU to monitor a driver present within the interior cabin of the vehicle;

a heat sink thermally coupled with the PCB, wherein the heat sink comprises a plurality of heat dissipating fins;

wherein a lower vent is formed through a lower portion of the mirror casing and an upper vent is formed through an upper portion of the mirror casing; and wherein, when the electronic component is electrically operated, (i) cooling airflow is drawn into the mirror head via the lower vent formed through the lower portion of the mirror casing, (ii) the cooling airflow drawn into the mirror head flows across the plurality of heat dissipating fins of the heat sink and (iii) the cooling airflow drawn into the mirror head exits the mirror head via the upper vent formed through the upper portion of the mirror casing.

2. The vehicular driver monitoring system of claim 1, wherein a video display device is accommodated by the mirror head, and wherein the video display device, when electrically operated, displays video images that are viewable by the driver of the vehicle.

3. The vehicular driver monitoring system of claim 2, wherein the heat sink is thermally coupled with the video display device.

4. The vehicular driver monitoring system of claim 2, wherein the video display device comprises the electronic component disposed at the PCB.

5. The vehicular driver monitoring system of claim 2, wherein the camera views through the video display device.

6. The vehicular driver monitoring system of claim 5, wherein the camera views through a light guide and at least one diffusion film disposed at the rear of the video display device.

7. The vehicular driver monitoring system of claim 6, wherein the light emitter is electrically operable to emit near infrared (NIR) light that passes through the light guide, the at least one diffusion film and the video display device.

8. The vehicular driver monitoring system of claim 1, wherein the ECU is disposed in the vehicle remote from the mirror head.

9. The vehicular driver monitoring system of claim 1, wherein the ECU is accommodated by the mirror head.

10. The vehicular driver monitoring system of claim 9, wherein the image processor of the ECU comprises the electronic component disposed at the PCB.

11. The vehicular driver monitoring system of claim 1, wherein the camera comprises the electronic component disposed at the PCB.

12. The vehicular driver monitoring system of claim 1, wherein the light emitter comprises the electronic component disposed at the PCB.

13. The vehicular driver monitoring system of claim 1, wherein a fan is accommodated by the mirror head and is electrically operable to draw the cooling airflow into the mirror head via the lower vent formed through the lower portion of the mirror casing.

14. The vehicular driver monitoring system of claim 13, wherein the fan comprises fan blades that rotate about an axis of rotation that is parallel to a longitudinal axis of the heat dissipating fins of the heat sink.

15. The vehicular driver monitoring system of claim 13, wherein the fan comprises fan blades that rotate about an axis of rotation that is perpendicular to a longitudinal axis of the heat dissipating fins of the heat sink.

16. The vehicular driver monitoring system of claim 13, wherein the fan comprises a piezo electric fan.

17. The vehicular driver monitoring system of claim 1, wherein the heat sink comprises an attachment plate thermally coupled with the second side of the PCB, and wherein the plurality of heat dissipating fins extend from the attachment plate away from the PCB.

18. The vehicular driver monitoring system of claim 1, wherein a profile of the plurality of heat dissipating fins corresponds to a profile of an interior surface of the mirror casing.

19. The vehicular driver monitoring system of claim 1, wherein, with the mounting structure attached at the interior portion of the interior cabin of the vehicle, a longitudinal axis of the plurality of heat dissipating fins is vertically oriented.

20. The vehicular driver monitoring system of claim 1, wherein the lower vent comprises lower slots formed through the lower portion of the mirror casing, and wherein the upper vent comprises upper slots formed through the upper portion of the mirror casing.

21. The vehicular driver monitoring system of claim 20, wherein the lower slots are at least in part aligned with respective first ends of the plurality of heat dissipating fins, and wherein the upper slots formed are at least in part aligned with respective second ends of the plurality of heat dissipating fins.

22. The vehicular driver monitoring system of claim 1, wherein the camera is disposed within the mirror head and views through the electrochromic mirror reflective element.

23. The vehicular driver monitoring system of claim 1, wherein the light emitter is disposed within the mirror head, and wherein the light emitter is electrically operable to emit near infrared (NIR) light that passes through the electrochromic mirror reflective element.

24. A vehicular driver monitoring system, the vehicular driver monitoring system comprising:

an interior rearview mirror assembly comprising a mirror head adjustable about a mounting structure, wherein the mounting structure is configured to attach at an interior portion of an interior cabin of a vehicle equipped with the vehicular driver monitoring system;

wherein the mirror head comprises a mirror casing, and wherein the mirror head accommodates an electrochromic mirror reflective element;

a camera accommodated at the mirror head;

wherein, with the mounting structure attached at the interior portion of the interior cabin of the vehicle, the camera views a driver-head region within the interior cabin of the vehicle;

a light emitter accommodated at the mirror head;

wherein the light emitter, with the mounting structure attached at the interior portion of the interior cabin of the vehicle, is electrically operable to emit near infrared (NIR) light that illuminates at least the driver-head region within the interior cabin of the vehicle;

wherein a video display device is accommodated by the mirror head, and wherein the video display device, when electrically operated, displays video images that are viewable by a driver of the vehicle;

wherein, with the mounting structure attached at the interior portion of the interior cabin of the vehicle, the camera is operable to capture image data at least when the light emitter is electrically operated to emit near infrared (NIR) light that illuminates at least the driver-head region within the interior cabin of the vehicle;

an electronic control unit (ECU) disposed in the vehicle remote from the mirror head;

wherein image data captured by the camera is transferred to the ECU;

wherein the ECU comprises electronic circuitry and associated software, and wherein the electronic circuitry comprises an image processor operable to process image data transferred to the ECU, and wherein, with the mounting structure attached at the interior portion of the interior cabin of the vehicle, the ECU processes image data transferred to the ECU to monitor the driver present within the interior cabin of the vehicle;

a heat sink thermally coupled with the video display device, wherein the heat sink comprises a plurality of heat dissipating fins;

wherein a lower vent is formed through a lower portion of the mirror casing and an upper vent is formed through an upper portion of the mirror casing; and wherein, when the video display device is electrically operated, (i) cooling airflow is drawn into the mirror head via the lower vent formed through the lower portion of the mirror casing, (ii) the cooling airflow drawn into the mirror head flows across the plurality of heat dissipating fins of the heat sink and (iii) the cooling airflow drawn into the mirror head exits the mirror head via the upper vent formed through the upper portion of the mirror casing.

25. The vehicular driver monitoring system of claim 24, wherein the camera views through the video display device.

26. The vehicular driver monitoring system of claim 25, wherein the camera views through a light guide and at least one diffusion film disposed at the rear of the video display device.

27. The vehicular driver monitoring system of claim 26, wherein the light emitter is electrically operable to emit near infrared (NIR) light that passes through the light guide, the at least one diffusion film and the video display device.

28. The vehicular driver monitoring system of claim 24, wherein a fan is accommodated by the mirror head and is electrically operable to draw the cooling airflow into the mirror head via the lower vent formed through the lower portion of the mirror casing.

29. The vehicular driver monitoring system of claim 28, wherein the fan comprises fan blades that rotate about an axis of rotation that is parallel to a longitudinal axis of the heat dissipating fins of the heat sink.

30. The vehicular driver monitoring system of claim 28, wherein the fan comprises fan blades that rotate about an axis of rotation that is perpendicular to a longitudinal axis of the heat dissipating fins of the heat sink.

31. The vehicular driver monitoring system of claim 24, wherein a profile of the plurality of heat dissipating fins corresponds to a profile of an interior surface of the mirror casing.

32. The vehicular driver monitoring system of claim 24, wherein the lower vent comprises lower slots formed through the lower portion of the mirror casing, and wherein the upper vent comprises upper slots formed through the upper portion of the mirror casing.

33. The vehicular driver monitoring system of claim 32, wherein the lower slots are at least in part aligned with respective first ends of the plurality of heat dissipating fins, and wherein the upper slots formed are at least in part aligned with respective second ends of the plurality of heat dissipating fins.

34. A vehicular driver monitoring system, the vehicular driver monitoring system comprising:

an interior rearview mirror assembly comprising a mirror head adjustable about a mounting structure, wherein the mounting structure is configured to attach at an interior portion of an interior cabin of a vehicle equipped with the vehicular driver monitoring system;

wherein the mirror head comprises a mirror casing, and wherein the mirror head accommodates an electrochromic mirror reflective element;

a camera accommodated at the mirror head;

wherein the camera is disposed within the mirror head and views through the electrochromic mirror reflective element;

wherein, with the mounting structure attached at the interior portion of the interior cabin of the vehicle, the camera views a driver-head region within the interior cabin of the vehicle;

a light emitter accommodated at the mirror head;

wherein the light emitter, with the mounting structure attached at the interior portion of the interior cabin of the vehicle, is electrically operable to emit near infrared (NIR) light that (i) passes through the electrochromic mirror reflective element and (ii) illuminates at least the driver-head region within the interior cabin of the vehicle;

wherein a printed circuit board (PCB) is accommodated by the mirror head, and wherein the PCB comprises (i) a first side that faces the electrochromic mirror reflective element, and (ii) a second side opposite the first side and separated from the first side by a thickness of the PCB;

wherein an electronic component is disposed at the PCB;

wherein, with the mounting structure attached at the interior portion of the interior cabin of the vehicle, the camera is operable to capture image data at least when the light emitter is electrically operated to emit near infrared (NIR) light that illuminates at least the driver-head region within the interior cabin of the vehicle;

an electronic control unit (ECU);

wherein image data captured by the camera is transferred to the ECU;

wherein the ECU comprises electronic circuitry and associated software, and wherein the electronic circuitry comprises an image processor operable to process image data transferred to the ECU, and wherein, with the mounting structure attached at the interior portion of the interior cabin of the vehicle, the ECU processes image data transferred to the ECU to monitor a driver present within the interior cabin of the vehicle;

a heat sink thermally coupled with the PCB, wherein the heat sink comprises a plurality of heat dissipating fins;

wherein a lower vent is formed through a lower portion of the mirror casing and an upper vent is formed through an upper portion of the mirror casing;

wherein the lower vent comprises lower slots formed through the lower portion of the mirror casing, and wherein the upper vent comprises upper slots formed through the upper portion of the mirror casing; and wherein, when the electronic component is electrically operated, (i) cooling airflow is drawn into the mirror head via the lower vent formed through the lower portion of the mirror casing, (ii) the cooling airflow drawn into the mirror head flows across the plurality of heat dissipating fins of the heat sink and (iii) the cooling airflow drawn into the mirror head exits the mirror head via the upper vent formed through the upper portion of the mirror casing.

35. The vehicular driver monitoring system of claim 34, wherein a video display device is accommodated by the mirror head, and wherein the video display device, when electrically operated, displays video images that are viewable by the driver of the vehicle.

36. The vehicular driver monitoring system of claim 35, wherein the heat sink is thermally coupled with the video display device.

37. The vehicular driver monitoring system of claim 34, wherein the ECU is disposed in the vehicle remote from the mirror head.

38. The vehicular driver monitoring system of claim 34, wherein the ECU is accommodated by the mirror head, and wherein the heat sink is thermally coupled with the image processor of the ECU.

39. The vehicular driver monitoring system of claim 34, wherein a fan is accommodated by the mirror head and is electrically operable to draw the cooling airflow into the mirror head via the lower vent formed through the lower portion of the mirror casing.

40. The vehicular driver monitoring system of claim 34, wherein the heat sink comprises an attachment plate thermally coupled with the second side of the PCB, and wherein the plurality of heat dissipating fins extend from the attachment plate away from the PCB.

41. The vehicular driver monitoring system of claim 34, wherein the lower slots are at least in part aligned with respective first ends of the plurality of heat dissipating fins, and wherein the upper slots formed are at least in part aligned with respective second ends of the plurality of heat dissipating fins.

* * * * *